United States Patent Office 3,567,677
Patented Mar. 2, 1971

3,567,677
FLEXIBLE, REPAIRABLE, POTTABLE MATERIAL FOR ELECTRICAL CONNECTORS
James E. Webb, Administrator of the National Aeronautics and Space Administration, with respect to an invention of Robert A. Dunaetz, Manhattan Beach, and Philip C. Crepeau, Buena Park, Calif.
No Drawing. Filed Apr. 16, 1968, Ser. No. 721,607
Int. Cl. C08g 23/14
U.S. Cl. 260—37         10 Claims

ABSTRACT OF THE DISCLOSURE

A flexible, repairable, pottable composition of matter suitable for encapsulating electrical connectors comprises diglycidyl ether of bisphenol A, diepoxide of polyglycol, and one or more amine curing agents. Optionally, the composition can contain one or more fillers in amounts which vary with the composition viscosity desired.

ORIGIN OF THE INVENTION

The invention described herein was made in the performance of work under a NASA contract and is subject to the provisions of the National Aeronautics and Space Act of 1958, Public Law 85–568 (72 Stat. 435, 42 U.S.C. 2457).

This invention relates to a flexible, repairable, pottable composition of matter curable at ambient temperatures, and to electrical connectors encapsulated with said composition in cured condition.

More particularly, the invention relates to a flexible, repairable, pottable composition curable at room temperatures comprising, optionally, one or more fillers, diglycidyl ether of bisphenol A, diepoxide of polyglycol, and at least one amine curing agent, and to electrical connectors encapsulated with said composition in cured, thermoset condition.

Epoxy resins have been used alone and with various fillers as potting material for electrical connectors of various kinds. However, a need has long existed for a potting composition which is both tough and flexible, has good dielectric strength and handling resistance, and is easily and readily prepared and applied at ambient temperatures by standard techniques known to the art. In addition, a useful potting composition should be readily repairable in minimum time and at minimum expense.

It is an object of this invention to provide a potting composition made of materials which are readily available, easily prepared, and readily applied to electrical connectors.

Another object of the invention is to provide a potting composition which produces a tough, flexible encapsulation on electrical connectors in a relatively short time at ambient temperatures.

Another object of the invention is to provide a potting composition, and electrical connectors encapsulated therewith, which exhibit good dielectric strength and superior handling resistance, are tough and flexible, and yet are easily and readily prepared at minimum expense.

Accordingly, the invention comprises a potting composition comprising diglycidyl ether of bisphenol A, diepoxide of polyglycol, at least one amine curing agent and, optionally, one or more fillters. The invention further comprises electrical connectors encapsulated with a thermoset composition comprising diglycidyl ether of bisphenol A, diepoxide of polyglycol, at least one amine curing agent and, optionally, one or more fillers. The formula for diglycidyl ether of bisphenol A is:

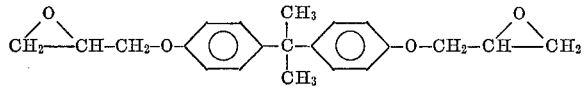

and the formula for diepoxide of polyglycol is:

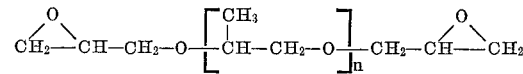

where $n$ is 4 through 9.

A potting composition of this invention can contain from 45 to 55 parts by weight of diglycidyl ether of bisphenol A, from 45 to 55 parts by weight of diepoxide of polyglycol, from 2 to 75 parts by weight of at least one filler, and a stoichiometric quantity of one or more amine curing agents. A particularly suitable composition for forming the electrical connectors of the invention comprises 45–55 parts by weight of diglycidyl ether of bisphenol A, 45–55 parts by weight of diepoxide of polyglycol, and 19–20 parts by weight of amine curing agent such as N-aminoethylpiperazine.

Amine curing agents suitable for use in the composition of the invention include: primary, secondary and tertiary aliphatic, aromatic, araliphatic, and heterocyclic amines. Polyamino compounds can also be used. In addition, examples of such amines are: N-amino-ethylpiperazine, menthane diamine, m-phenylenediamine, diaminodiphenylsulfone, a 1:1 molar adduct of allylglycidyl ether and N-aminoethylpiperazine, 2,4,6-tris (dimethylaminomethyl)phenol, 2-(dimethylaminomethyl)phenol and a 1:1:1 molar adduct of allylglycidyl ether, N-aminoethylpiperazine and the diglycidyl ether of polypropylene glycol, their adducts and mixtures, added in stoichiometric amounts.

Among the suitable fillers for use in the composition of this invention are colloidal silica, silica, alumina, and talc.

Electrical connectors of the invention are prepared as follows: (1) plastic insulation (such as Teflon), if any, is etched from the wire to be encapsulated only in the area which is to be covered with the potting compositions; (2) organic acid flux, if any, is removed from the wire portion to be encapsulated by scrubbing that portion with a mild detergent solution and then rinsing; (3) resin base flux, if any, is scrubbed from the area of the wire to be encapsulated with a solution containing isopropyl alcohol or an equivalent solvent, then drying that portion. Any wire insulation to be imbedded in the potting composition should be cleaned concurrently.

The molds in which the connectors are encapsulated are generally of two types: those which do not form part of the finished connector, and those which form a permanent shell on the connector. For molds to be removed upon completion of the cure of the potting composition, a brush or wipe coat of a suitable silicone mold release is applied to the interior of the mold, which is then allowed to dry, conveniently at room temperature. In forming connectors intended to retain the mold as a permanent shell on the connectors, the interior surfaces of the mold should be scuffed or roughened lightly to remove surface gloss therefrom, and then cleaned with a suitable inert hydrocarbon solvent such as benzene or toluene.

The potting composition of the invention is prepared for use by mixing the ingredients thereof in a deep, smooth-walled container having a volume approximately 10 times that of the contents until the mixture is of homogeneous consistency. The mixture is degassed immediately after mixing by applying thereto a vacuum of 5 mm. of mercury or less until the foaming and bubbling ceases. At this vacuum level, degassing can be accomplished in from 2 to 5 minutes. After the mixture is degassed, air should be excluded therefrom, and the material should be used as soon as possible.

The wires to be encapsulated are placed in the prepared mold in the desired position, and can be held therein by means of lacing or masking tape, thus providing uniform spacing prior to introduction of the potting composition into the mold. The prepared potting composition can be introduced into the mold by any means known to the art, such as by the use of a disposable syringe. If possible, the syringe nozzle should be placed well into the cavity of the mold to minimize agitation of the flowing, degassed mixture. The mold cavity should be filled to excess to allow for the slight shrinkage of the insulating composition during cure thereof.

At room temperature, the potting composition should be permitted to cure for at least 48 hours, and the temperature should be maintained at not less than 75° F. Below 75° F., the curing agent tends to evaporate partially prior to completion of the cure. At higher temperatures, curing rate is accelerated, and total time required for complete curing of the potting composition is lowered. For example, at 130° F., curing is complete in about eight hours; at 165° F., the minimum curing time is about 2 hours.

Following completion of the cure, the encapsulated electrical connectors can be removed from the mold and any flash trimmed if desired.

Should the encapsulation of the connector become chipped or otherwise gapped, the resulting void can be readily repaired using the potting composition of the invention. Preferably, for purposes of repairing such voids, from 8 to 10 parts by weight of one or more fillers such as colloidal silica or even larger amounts should be used with the composition of the invention so that a viscous mixture is obtained. Repair can be effected in accordance with the procedure discussed above for making the encapsulated connectors of the invention; however, no mold is required because the viscous repair composition will not flow readily.

If it is necessary to prepare the composition of the invention more than 30 minutes prior to its proposed use, the composition can be preserved by freezing same to temperatures of −40° F. or lower. Then, prior to use, the frozen, premixed composition is thawed to room temperature (a minimum of 65° F.) and is utilized directly without further processing.

The viscosity of the premixed composition can be varied by varying the amounts of filler therein. For example, a composition containing about 2 parts by weight of one or more fillers is a low viscosity material for use in sealing leaks in previously encapsulated connectors. A composition containing 3.5 to 4 parts by weight of one or more fillers is a medium viscosity material, and a composition containing 5 or more parts by weight of one or more fillers is high viscosity material which can be used for sealing connectors having large open areas in the encapsulation.

The following formulations were prepared in accordance with the invention:

| | Identification | Parts by weight |
|---|---|---|
| Number: | | |
| A | Diglycidyl ether of bisphenol A | 50 |
| | Diepoxide of polyglycol | 50 |
| | N-aminoethylpiperazine | 19.5 |
| | (A's ingredients were blended as described above) | |
| B | Diglycidyl ether of bisphenol A | 50 |
| | Diepoxide of polyglycol | 50 |
| | N-aminoethylpiperazine adducted with phenylgylcidyl ether in 1:1 mol ratio. | 56 |
| C | Diglycidyl ether of bisphenol A | 50 |
| | Diepoxide of polyglycol | 50 |
| | N-aminoethylpiperazine adducted with phenylglycidyl ether in 1:1 mol ratio. | 49 |
| D | Diglycidyl ether of bisphenol A | 50 |
| | Diepoxide of polyglycol and N-aminoethylpiperazine adducted with phenylglycidyl ether in 1:1 mol ratio pre-reacted before blending with diglycidyl ether of bisphenol A. | 96 |
| | DMP-30 (2,4,6-tris dimethylaminomethyl phenol) | 2.2 |

The above formulations had the following properties:

| Formula number | Viscosity, cps. | Pot life, hours | Tack free time, hours | Shore D hardness | Tensile strength, p.s.i. | Elongation, percent | T-peel strength on Al, lbs./width | Identification | Parts by weight | Comments |
|---|---|---|---|---|---|---|---|---|---|---|
| A | 6,000 | 1 | 24 | 55 | 1,500 | 100 | 5 | Dow epoxy resin 732 | 50 | Conventionally blended. |
| | | | | | | | | Shell epoxy resin 826 | 50 | |
| | | | | | | | | N-aminoethylpiperazine (AEP). | 19.5 | |
| B | 3,000 | 3 | 72 | 25 | 50 | 150 | 30 | Dow epoxy resin 732 | 50 | Curing agent pre-reacted in 1:1 mol ratio. |
| | | | | | | | | Shell epoxy resin 826 | 50 | |
| | | | | | | | | AEP-AGE adduct | 56 | |
| C | 1,700 | 12 | 18 | 56 | 1,350 | 300 | 50 | Dow epoxy resin 732 | 50 | Do. |
| | | | | | | | | Shell epoxy resin 826 | 50 | |
| | | | | | | | | AEP-AGE adduct | 49 | |
| D | 39,000 | 12 | 18 | 30 | 1,560 | 190 | 46 | Shell epoxy 826 | 50 | DER-732 curing agent pre-reacted. |
| | | | | | | | | Dow DER 732-AEP-AGE adduct. | 96 | |
| | | | | | | | | DMP-30 | 2.2 | |

Although the invention has been described with reference to certain preferred embodiments thereof, the spirit and scope of the invention is not to be limited except as defined in the following claims.

What is claimed is:

1. A flexible, repairable, pottable composition of matter suitable for encapsulating electrical connectors comprising from 45 to 55 parts by weight of diepoxide of polyglycol, from 45 to 55 parts by weight of diglycidyl either of bisphenol A, and from 19 to 20 parts by weight of N-aminoethylpiperazine, wherein the formula for diepoxide of polyglycol is:

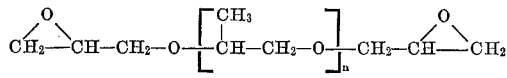

where $n$ is 4 through 9.

2. The composition of claim 1 further comprising at least one filler.
3. The composition of claim 2 wherein said filler is from 2-75 parts by weight.
4. The composition of claim 3 wherein said filler is colloidal silica.
5. An electrical connector encapsulated with a thermoset composition comprising from 45 to 55 parts by weight of diepoxide of polyglycol, from 45 to 55 parts by weight of diglycidyl ether of bisphenol A, and at least one amine curing agent, wherein the formula for diepoxide of polyglycol is:

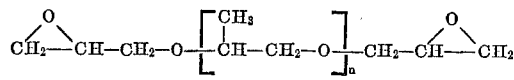

where $n$ is 4 through 9.

6. The connector of claim 5 wherein said thermoset composition further comprises at least one filler.
7. The connector of claim 5 wherein said composition comprises 50 parts by weight of diglycidyl ether of bisphenol A, 50 parts by weight of diepoxide of polyglycol, and wherein said amine curing agent is 19.5 parts by weight of N-aminoethylpiperazine.
8. The connector of claim 7, wherein said filler is colloidal silica.
9. The connector of claim 5, wherein said amine curing agent is from 19 to 20 parts by weight of N-aminoethylpiperazine.
10. The combination of claim 8 further including 2 to 6 parts by weight of a filler.

References Cited

Dow Chemical Co., Dow Flexible Epoxy Resins, Form No. 190-105-69 (1969), 22 pages & covers.

Shell Chemical Company, Epon Resins, Technical Bulletin SC: 68-36 (supersedes 62-131) 6 pages.

MORRIS LIEBMAN, Primary Examiner

S. M. PERSON, Assistant Examiner

U.S. Cl. X.R.

260—47